United States Patent
Kitayama et al.

(10) Patent No.: US 8,152,230 B2
(45) Date of Patent: Apr. 10, 2012

(54) CLOSURE ASSEMBLY FOR VEHICLE

(75) Inventors: Kenichi Kitayama, Tochigi (JP); Michael A. Schrader, Plain City, OH (US); Matthew Weyand Schmitt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/851,889

(22) Filed: Aug. 6, 2010

(65) Prior Publication Data
US 2012/0032473 A1 Feb. 9, 2012

(51) Int. Cl.
*B60J 7/047* (2006.01)
*B60J 7/22* (2006.01)

(52) U.S. Cl. .............. 296/220.01; 296/217; 296/216.04; 296/106; 296/216.02; 296/57.1

(58) Field of Classification Search ............... 296/76, 296/106, 146.8, 216.02, 216.04, 216.05, 296/57.1, 147, 219, 217, 222, 100.01, 146.16, 296/165, 220.01
See application file for complete search history.

(56) References Cited

U.S. PATENT DOCUMENTS

| | | | |
|---|---|---|---|
| 1,889,679 A | 11/1932 | Marin | |
| 2,086,091 A | 7/1937 | Payette | |
| 2,596,355 A | 5/1952 | Ackermans | |
| 2,997,336 A * | 8/1961 | Huggins et al. | 296/106 |
| 3,214,213 A | 10/1965 | Helzer et al. | |
| 3,378,298 A | 4/1968 | Wingen | |
| 3,419,304 A | 12/1968 | Sangimino | |
| 4,272,121 A | 6/1981 | Kim | |
| 4,274,670 A | 6/1981 | Pitzmann | |
| 4,323,274 A | 4/1982 | Soderberg et al. | |
| 4,620,743 A | 11/1986 | Eke | |
| 4,659,136 A | 4/1987 | Martin et al. | |
| 4,707,014 A | 11/1987 | Rich | |
| 4,712,827 A | 12/1987 | Jensen | |
| 5,183,310 A | 2/1993 | Shaughnessy | |
| 5,294,170 A | 3/1994 | Hsueh | |
| 5,921,611 A | 7/1999 | Townsend | |
| 5,997,072 A | 12/1999 | Parkinson | |
| 6,007,139 A | 12/1999 | Shave | |
| 6,241,302 B1 | 6/2001 | Rehkopf | |

(Continued)

FOREIGN PATENT DOCUMENTS

| | | | | |
|---|---|---|---|---|
| DE | 19513520 | * | 8/1996 | |
| JP | 362210124 | * | 9/1987 | .............. 296/216.03 |
| JP | 1289773 | | 11/1989 | |

OTHER PUBLICATIONS

Motorsnaps.com, http://www.motorsnaps.com/d/28353-3/2002+Webasto++Welcome.jpg.*

(Continued)

*Primary Examiner* — Dennis Pedder
(74) *Attorney, Agent, or Firm* — Rankin Hill & Clark LLP

(57) ABSTRACT

A vehicle includes a tailgate, a panoramic roof assembly and a dual-action rear hatch. The panoramic roof assembly has a plurality of positions including a closed position and a raised position. The dual-action rear hatch has a sliding mode wherein the hatch is movable from a closed position to a slide forward position wherein the rear hatch is received under the roof assembly when in the raised position, and has a flip-open position wherein the rear hatch is flipped-open while in a slide closed position.

19 Claims, 4 Drawing Sheets

U.S. PATENT DOCUMENTS

| | | | |
|---|---|---|---|
| 6,305,740 B1 | 10/2001 | Staser et al. | |
| 6,447,050 B1 | 9/2002 | Plassmeyer et al. | |
| 6,485,094 B2 * | 11/2002 | Corder et al. | 296/222 |
| 6,494,528 B2 | 12/2002 | Tolinski et al. | |
| 6,505,878 B1 | 1/2003 | Mascolo | |
| 6,695,377 B2 * | 2/2004 | Paiva et al. | 296/56 |
| 6,789,830 B2 | 9/2004 | Van Bussel | |
| 6,874,838 B2 | 4/2005 | De Gaillard | |
| 7,029,058 B2 | 4/2006 | Mathew | |
| 7,032,962 B2 | 4/2006 | Engelgau et al. | |
| 7,140,657 B2 | 11/2006 | Cuma | |
| 7,334,833 B2 | 2/2008 | Koelbl et al. | |
| 7,354,095 B2 | 4/2008 | Fleming et al. | |
| 7,438,342 B2 | 10/2008 | Greenwood | |
| 7,494,175 B2 | 2/2009 | Condon et al. | |
| 7,651,148 B2 | 1/2010 | Hustyi et al. | |
| 2005/0253406 A1 | 11/2005 | Faubert et al. | |
| 2008/0315632 A1 * | 12/2008 | Righetti | 296/217 |

OTHER PUBLICATIONS

Office Action of U.S. Appl. No. 12/851,813 dated Jul. 18, 2011.
Office Action of U.S. Appl. No. 12/851,899 dated Jul. 19, 2011.
Citroen C3 Pluriel—photographs 1 and 2.
Renault Be-Bop—photographs 1 and 2, 2003.
GMC Envoy XUV—photograph 1.
Webasto Welcome Concept—photograph 1, 2002.
Studebaker Wagonaire—photograph 1.
U.S. Appl. No. 12/851,897, filed Aug. 6, 2010, Titled "Spoiler for Rear Hatch Closure Assembly".
U.S. Appl. No. 12/851,899, filed Aug. 6, 2010, Titled "Slide Hatch Assembly".
U.S. Appl. No. 12/851,813, filed Aug. 6, 2010, Titled "Dual Action Rear Hatch".
Office Action of U.S. Appl. No. 12/851,813 dated Oct. 27, 2011.

* cited by examiner

CLOSURE ASSEMBLY FOR VEHICLE

BACKGROUND

The present disclosure generally relates to vehicles, and more particularly relates to a closure assembly for a vehicle (e.g., a coupe-type vehicle or hatchback vehicle) having a rear cargo opening.

Vehicle design is often focused on providing increased and/or improved cargo carrying capabilities for vehicles. This is particularly important for smaller, compact vehicles where there is often limited space available to dedicate to carrying cargo. Many smaller vehicles incorporate a flip-up hatch closure on the rear of the vehicle for providing access into the rear of the vehicle. Some hatch closures include a lower hatch closure that flips down and an upper hatch closure that flips up. Whether the entire hatch closure or only an upper hatch closure flips-up, these designs are often limited in that the vehicle is not designed to be driven with the hatch closures in the flipped-up positions.

Several known vehicles are configured in an attempt to provide improved cargo carrying capabilities for the vehicle. One such vehicle is the 2004 Citroen C3 Pluriel. This vehicle has a retractable soft top with a pivotable closure provided in a rear portion of the soft top facing a rear of the vehicle, and also has a drop-down tailgate disposed below the pivotable closure in the rear of the vehicle. The pivotable closure can be pivoted upward and the tailgate pivoted downward to provide a large cargo opening into the rear of the vehicle. Drawbacks of this arrangement relate to the use of a soft top and range from undesirable road noise entering the vehicle to insufficient durability to limited theft prevention.

Another known vehicle is the Renault Be-Bop concept vehicle shown at the 2003 Frankfurt Motor Show. This vehicle has a rear tailgate and an adjacent sliding roof panel. The tailgate has a vertically retractable window and is configured as a swing-out tailgate (i.e., the tailgate is pivoted open about a vertical axis). The sliding roof panel is movable to a slide open position forward along the vehicle's roof. When the tailgate is in the swing-open position and the roof panel is slid open, a large cargo opening is provided (i.e., the cargo opening includes the opening normally closed by the tailgate combined with the opening normally closed by the sliding roof panel. Drawbacks associated with this vehicle include its boxy and truck-like appearance and its use of exterior tracks for the sliding roof panel, which exposes the tracks to environmental elements and contributes to an overall unsightly appearance. Another similar vehicle is the 2003-2004 GMC Envoy XUV, but this vehicle uses a powered sliding roof panel, which significantly increases costs of the vehicle.

Still another known vehicle is the Webasto Welcome concept vehicle shown in or about 2002. This vehicle has a drop-down tailgate and an adjacent sliding roof panel. The tailgate and the roof panel can both be moved to their respective open positions for providing a combined rear cargo opening. Drawbacks of this vehicle include a boxy rear end and a relatively small sized cargo opening. Also, this sliding hatch is not optimally designed for driving while in the open position.

An older example vehicle with a similar combined rear cargo opening is the 1963 Studebaker Wagoneer. This vehicle is believed to be one of the first mass produced vehicles to offer a transforming rear cargo area. It includes a tailgate having a rear window that slides or retracts down into the tailgate body and a sliding roof panel disposed adjacent the tailgate. Drawbacks associated with this vehicle include severe water leak issues and the use of the inconvenient sliding rear window.

SUMMARY

According to one aspect, a coupe-type vehicle includes a vehicle body defining a cargo opening having a rearward portion and a forward portion. The forward portion is contiguous with the rearward portion. A tailgate extends across a rear portion of the vehicle body for selectively closing the rear portion of the cargo opening. The tailgate is movable to an open position for opening the rear portion of the cargo opening. A sliding hatch extends across the vehicle body forward of the tailgate for selectively closing the forward portion of the cargo opening. A forward edge of the hatch is mated against an upper edge of the tailgate when the tailgate and the hatch are in respective closed positions. The sliding hatch is slidable to a slide open position for opening the forward portion of the cargo opening. A roof panel is disposed forward of the sliding hatch. The roof panel is movable to a raised position for accommodating the sliding hatch below the roof panel when the sliding hatch is moved toward the slide open position.

According to another aspect, a vehicle having a rear cargo opening includes laterally spaced apart rear quarter panels having side portions and rear corner portions. The side portions include roof support members respectively extending upwardly from the rear corner portions. A rear portion of the cargo opening is defined between the rear corner portions of the rear quarter panels below lower ends of the roof support members. A forward portion of the cargo opening is defined between the roof support members above the rear corner portions. A tailgate selectively closes the rear portion of the cargo opening and a sliding hatch member selectively closes the forward portion of the cargo opening.

According to a further aspect, a hatchback vehicle includes a drop-down tailgate, a panoramic roof assembly and a dual-action rear hatch. The panoramic roof assembly has a plurality of positions including a closed position and a raised position. The dual-action rear hatch has a sliding mode wherein the hatch is movable from a closed position to a slide forward position wherein the rear hatch is received under the roof assembly when in the raised position, and has a flip-open mode wherein the rear hatch is flipped-open while in a slide closed position.

DETAILED DESCRIPTION

Figure 1:
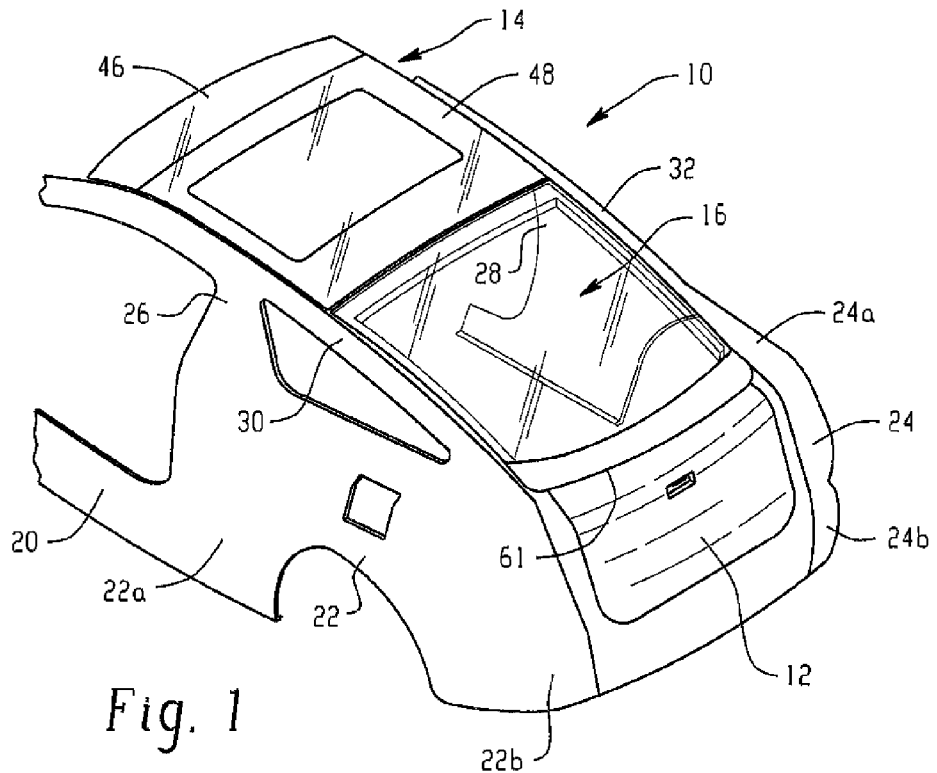
FIG. 1 is a schematic perspective view of a coupe-type hatchback vehicle having a drop-down tailgate, a panoramic roof assembly, and a dual-action rear hatch, all shown in respective closed positions.

Referring now to the drawings wherein the showings are for purposes of illustrating one or more exemplary embodiments and not for purposes of limiting same, FIG. 1 illustrates a vehicle 10 having a tailgate 12, a panoramic roof assembly 14 and a dual-action rear hatch 16. As shown, the vehicle 10 can be a coupe-type vehicle and/or a hatchback vehicle, such as the type having a rear cargo opening 18 (fully shown in FIG. 6). More particularly, the vehicle 10 has a vehicle body 20 that defines the cargo opening 18 between a pair of laterally spaced apart rear quarter panels or panel members 22, 24. As shown, the rear quarter panels 22, 24 have side portions 22a, 24a and rear corner portions 22b, 24b. The rear corner portions 22b, 24b define a rear portion of the vehicle body 20 in the illustrated embodiment. The tailgate 12 and the rear hatch 16 together comprise a rear closure assembly for the cargo opening 18.

The side portions 22a, 24a of the rear quarter panels 22, 24 include roof support members, including forward roof support members 26, 28 and rearward roof support members 30, 32. The forward roof support members 26, 28 can be the C-pillars of the vehicle body 20 and the rearward roof support members can be roof rails extending between the C-pillars and the rear corner portions 22b, 24b. More specifically, in the illustrated embodiment, the rearward roof support members 30, 32 are angularly oriented roof rails 30, 32 that have lower ends connected to the corner portions 22b, 24b and upper ends connected to the upper ends of the C-pillars 26, 28. The roof rails 30, 32 extend upward from the rear corner portions 22b 24b and thus extend from the rear portion of the vehicle body 20 defined by the rear corner portions 22b, 24b.

Figure 5:
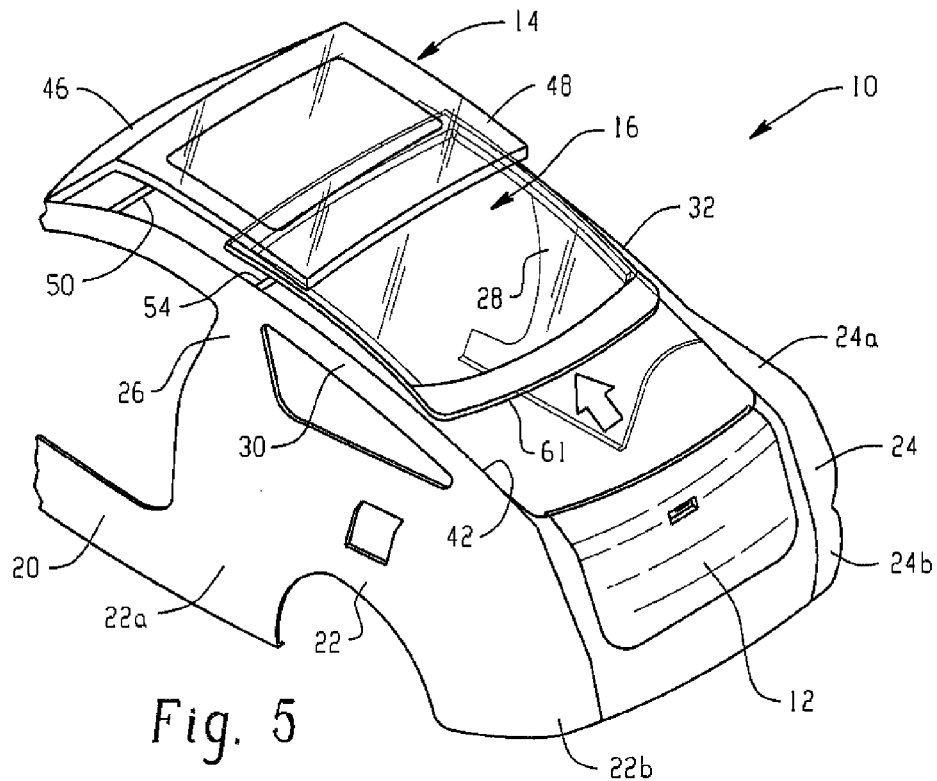
FIG. 5 is a further schematic perspective view of the vehicle of FIG. 1 shown with the tailgate in the closed position, the roof assembly in a maximum open position and the rear hatch slidably moving toward a slide open position under the roof assembly.

The rear cargo opening 18 has a rearward portion 40 (FIG. 2) and a forward portion 42 (FIG. 5). The forward portion 42 is contiguous with the rearward portion 40 to form the opening 18 as a relatively large opening in the vehicle body 20 on the vehicle 10. The rear quarter panels 22, 24 define lateral sides of the rear cargo opening 18, including lateral sides of each of the rearward portion 40 and the forward portion 42. In particular, the forward portion 42 of the cargo opening 18 is defined between the roof support members 30, 32 above the rear corner portions 22b, 24b. The rear or rearward portion 42 of the cargo opening 18 is defined between the rear corner portions 22b, 24b below the lower ends of the rear roof support members 30, 32. Accordingly, the rear roof support members 30, 32 define lateral sides of the forward portion 40 of the cargo opening 18 and the rear corner portions 22b, 24b define lateral sides of the rearward portion 42 of the cargo opening 18 at the rear of the vehicle 10.

Figure 2:
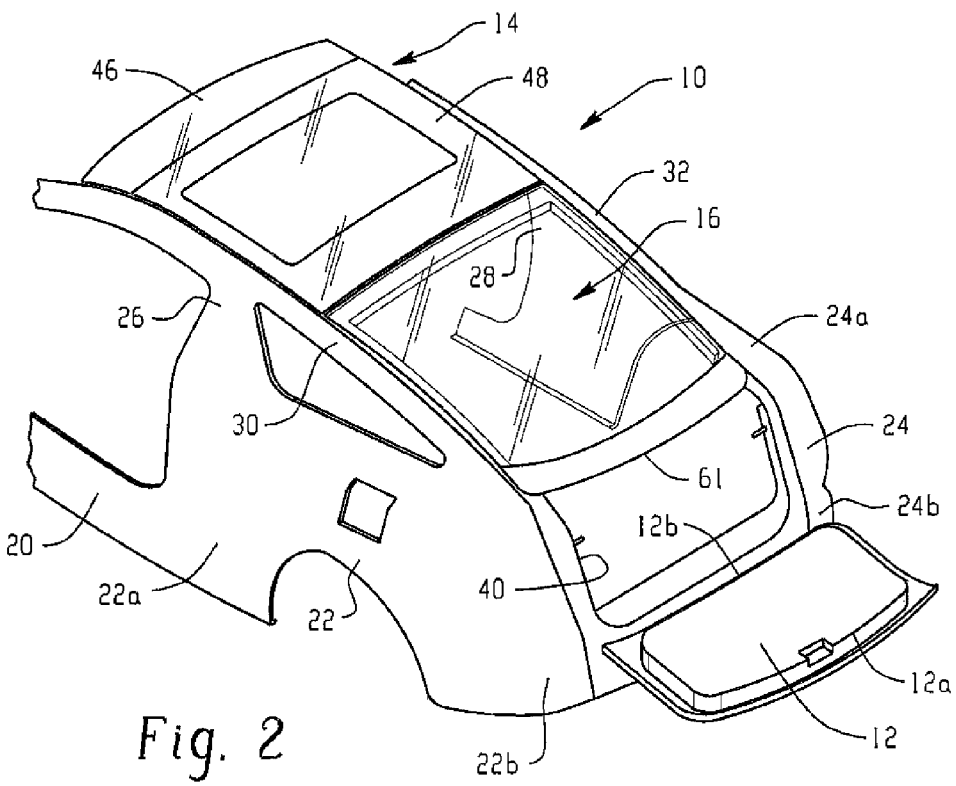
FIG. 2 is a schematic perspective view of the vehicle of FIG. 1 shown with the drop-down tailgate in an open position, the roof assembly in a closed position and the rear hatch in a slide closed position.

With additional reference to FIG. 2, the tailgate 12 extends across the rear portion of the vehicle body 20 (the rear portion defined by the corner portions 22b, 24b of the rear quarter panels 22, 24) for selectively closing the rear portion 40 of the cargo opening 18. The tailgate 12 is movable to an open position (shown in FIG. 2) for opening the rear portion 42. In the illustrated embodiment, the tailgate 12 is a drop-down or flip-down tailgate and is windowless, though these are not required. When in the open position shown in FIG. 2, the tailgate 12 forms a load-carrying platform extending from an upper edge 12a of the tailgate 12 to a lower edge 12b of the tailgate 12 (i.e., the lower edge 12b being pivotally connected to the vehicle body 20). In particular, the tailgate 12 can be a flip or swing-down tailgate pivotally mounted to the rear quarter panels 22, 24 at or adjacent the lower edge 12b of the tailgate 12.

As will be described in more detail below, the panoramic roof assembly 14 can have a plurality of positions including a closed position (shown in FIGS. 1 and 2) and one or more raised positions (shown in FIGS. 3-6). In the illustrated embodiment, the roof assembly 14 is a dual-panel assembly including a forward panel 46 and a rearward panel 48 hingedly connected to the forward panel 46 along adjacent edges 46a, 48a of the panels 46, 48. The roof assembly 14, including the panels 46, 48, is disposed forward of the rear hatch 16 on the vehicle body 20. As will be described in more detail below, the rearward panel 48 is movable to one or more of its raised positions for accommodating the hatch 16 below the roof panel 48.

Figure 3:
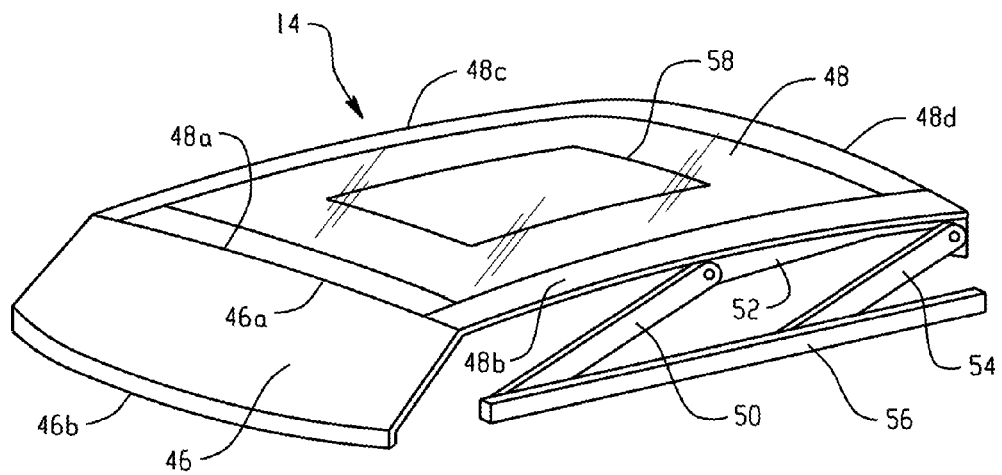
FIG. 3 is a schematic perspective view of the panoramic roof assembly of FIG. 1 shown in isolation in a raised position.

As shown in FIG. 3, lateral sides 48b, 48c of the roof panel 48 can be movably mounted to the vehicle body 20 by links (only one set of links 50, 52, 54 shown for side 48b). In particular, the links 50, 52, 54 can connect the roof panel 48 to mounting rails (only one rail 56 shown for side 48b), which are themselves connected or mounted to the vehicle body 20. Accordingly, a rearward edge 48d of the roof panel 48 is free and not connected directly to the vehicle body 20, but is sealable to the rear hatch 14. The forward edge 48a is connected to the adjacent edge 46a of the forward panel 46 and the forward edge 46b of the forward panel 46 can be pivotally connected to the vehicle body 20. In the illustrated embodiment, each of the roof panels 46, 48 is a rigid panel. For example, the panels 46, 48 can be generally formed by a glass panel (or some other transparent material) and can be supported on a frame. Seals can be provided on the panels 46, 48 for sealing with the vehicle body 20 and/or the rear hatch 14. For example, seal 58 can be provided on an underside of the panel 46 for sealing against an upwardly facing surface on the vehicle body 20, such as a rim or gutter surrounding a roof opening (not shown).

Figure 4:
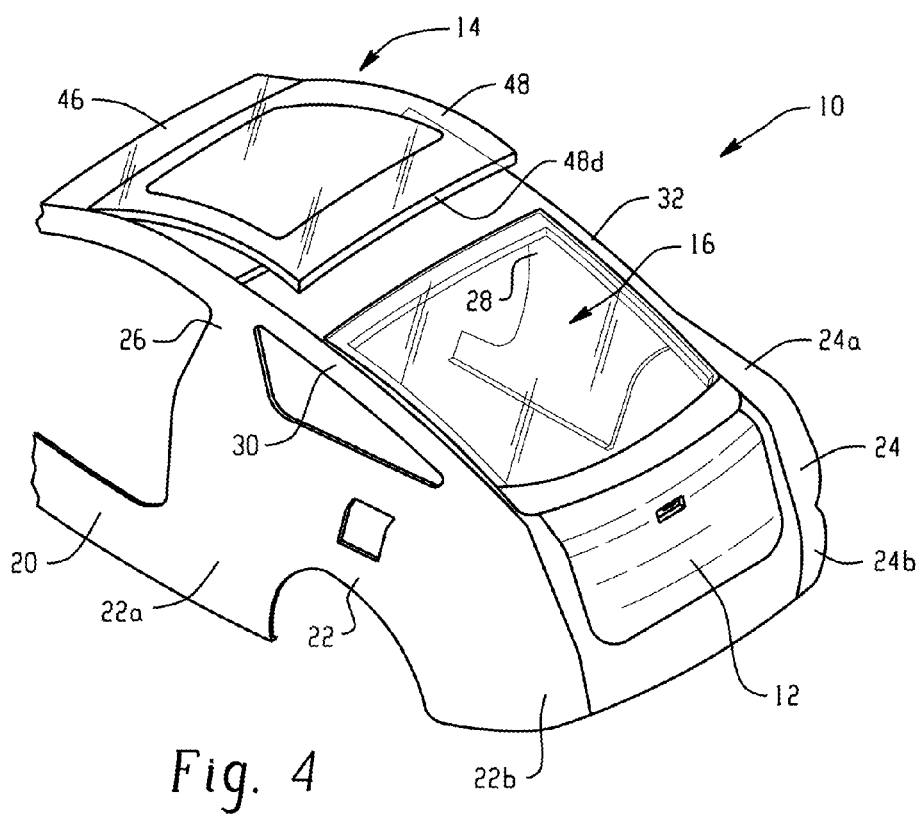
FIG. 4 is another schematic perspective view of the vehicle of FIG. 1 shown with the tailgate in the closed position, the roof assembly in a tilt open position and the rear hatch in the slide closed position.

The rear roof panel 48 of the illustrated embodiment is movable to at least three positions, including the raised position for accommodating the hatch 16 (FIGS. 5 and 6), the closed position (FIGS. 1 and 2), and a tilt position (FIG. 4). In the tilt position of FIG. 4, the free, rear edge 48d of the rear roof panel 48 is slightly elevated relative to a roof of the vehicle 10, similar to the tilt mode conventionally found in vehicle sunroofs. The raised position can include a first raised sub-position or "max open" position (FIG. 5) for allowing sliding movement of the hatch 16 between a slide closed position (FIG. 1) and a slide open position (FIG. 6) and a second raised sub-position or "final open" position (FIG. 6) for harboring the hatch 16 in the slide open position. As shown, the first raised sub-position of FIG. 5 can be elevated higher than the second sub-position of FIG. 6. In particular, the first raised sub-position can be a maximum open position that allows for easier relative movement (e.g., greater clearances) between the hatch 16 and the roof panel 48. The second sub-position can be one which facilitates driving of the vehicle 10 when the hatch 16 is moved to the slide open position (e.g., causes less wind drag). Accordingly, in the illustrated embodiment, the plurality of positions for the rear panel 48 can include the closed position shown in FIGS. 1 and 2, the tilt position shown in FIG. 4, the first maximum raised position shown in FIG. 5, and the second slightly lower or final open position shown in FIG. 6.

The sliding hatch 16 extends across the vehicle body 20 forward of the tailgate 12 for selectively closing the forward portion 40 of the cargo opening 18. As shown in FIG. 1, a rearward edge 61 of the hatch 16 mates against the upper edge 12a of the tailgate 12 when the tailgate 12 and the hatch 16 are each in respective closed positions. The sliding hatch 16 is slidable from the closed position shown in FIG. 1 to the slide open position shown in FIG. 6 for opening the forward portion 42 of the cargo opening 18. In particular, the roof panel 48 can be moved to the max open raised position shown in FIG. 5 for accommodating movement of the sliding hatch 16 when the sliding hatch 16 is moved toward the slide open position of FIG. 6.

Figure 6:
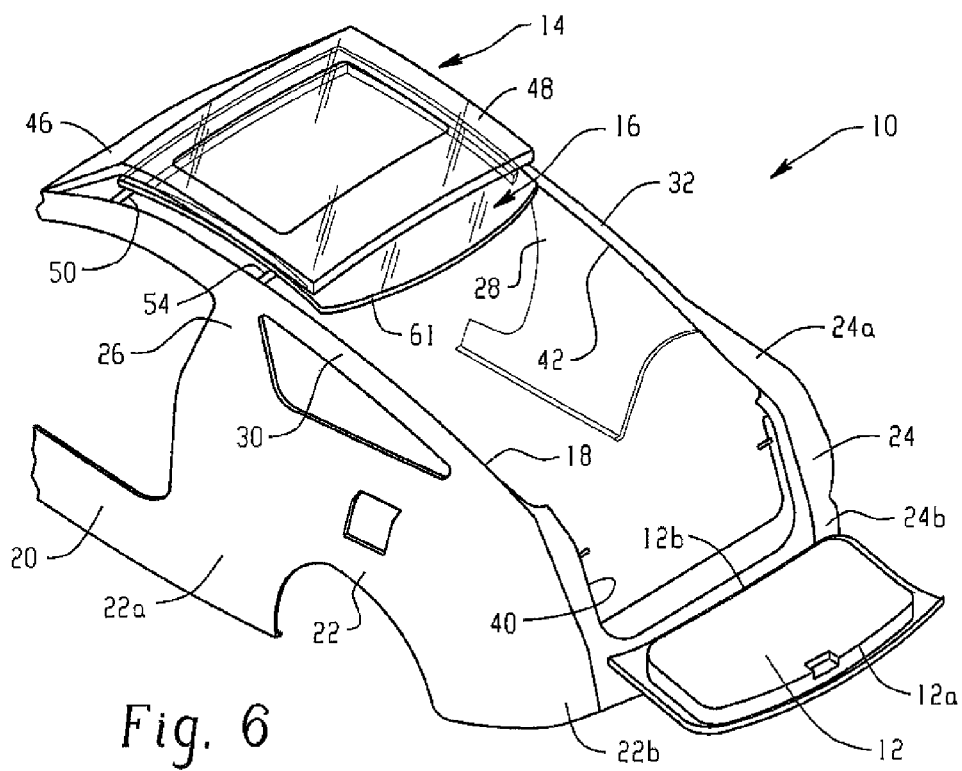
FIG. 6 is still another schematic perspective view of the vehicle of FIG. 1 shown with the tailgate in the open position, the roof assembly in a final open position and the rear hatch in the slide open position under the roof assembly.
Figure 7:
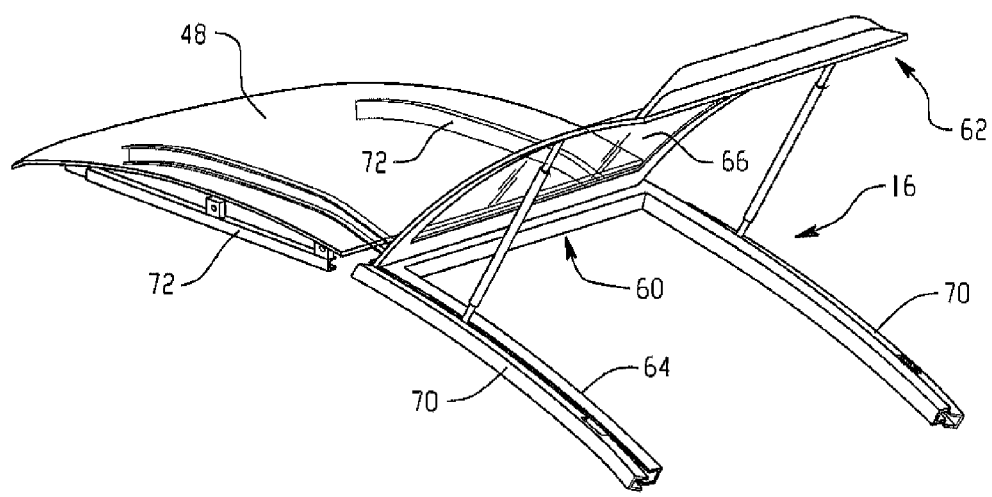
FIG. 7 is a partial schematic perspective view of the vehicle of FIG. 1 shown with a pivotal closure of the rear hatch in a pivot open position and the rear hatch in the slide closed position.

More particularly, the hatch 16 can have a sliding mode wherein the hatch 16 slidably movable from the closed position shown in FIGS. 1 and 2 to a slide forward or open position shown in FIG. 6 (the hatch 16 is shown sliding from the closed position to the slide open position in FIG. 5). In the slide open position, the rear hatch 16 is received under the roof assembly 14 with the roof assembly 14 in its raised position (e.g., the raised positions shown in FIGS. 5 and 6). The hatch 16 can also have a flip-open mode wherein the rear hatch 16 is flipped-open as shown in FIG. 7 while in the slide closed position. This also provides access through the forward portion 42. Sliding of the hatch 16 can be facilitated by rollers mounted to the hatch 16 that are received within tracks 70, 72 (FIG. 7) mounted to the vehicle body 20. Pivoted opening of the hatch 16 can be facilitated by hinges (not shown) that pivotally mount the hatch closure 62 to the hatch frame 64.

With particular reference to FIG. 7, in the illustrated embodiment, the sliding hatch 16 includes a slide frame 60 and a hatch closure 62 pivotally mounted to the frame 60. The hatch closure 62 is pivotally openable to provide access through the forward portion 42 (FIG. 6) of the cargo opening 18 while the sliding hatch 16 is in the slide closed position. More particularly, the frame 60 defines a hatch opening 64 and the hatch closure 62, which can be referred to as a pivotable closure, can selectively close the hatch opening 64. The pivotal closure 62 is movable from the closed position (shown in FIGS. 1 and 2) to a pivot open position (shown in FIG. 7) for opening or providing access through the hatch opening 64. The sliding hatch 16, and particularly the hatch closure 62, includes a window 66 providing rearward viewing for the vehicle body 20 when the hatch closure 62 is closed and the hatch 16 is in the slide closed position.

In operation, the tailgate 12 and/or the rear hatch 16 can be opened for providing access through the rear cargo opening 18. For example, the tailgate 12 can be opened as shown in FIG. 2. Alternatively or in addition, the sliding hatch 16 can be moved to the slide open position wherein the sliding hatch 16 is slidably received under the roof panel 48 when in a raised position. When both the tailgate 12 is in the open position and the hatch 16 is in the slide open position, the vehicle 10 is transformed into a vehicle with truck-like cargo carrying capability, while the vehicle 10 can still remain as a coupe-type or other compact vehicle. Accordingly, in a coupe-type vehicle or other small vehicle, large cargo carrying capability is provided. Still further, when the slide hatch 16 is in the slide closed position, the hatch closure 62 can be moved or pivoted to the pivot open position as shown in FIG. 7 to provide access through the cargo opening 18, particularly through the hatch opening 64.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A coupe-type vehicle, comprising:
   a vehicle body defining a cargo opening having a rearward portion and a forward portion, the forward portion contiguous with the rearward portion;
   a tailgate extending across a rear portion of the vehicle body for selectively closing the rear portion of the cargo opening, the tailgate movable to an open position for opening the rear portion of the cargo opening;
   a sliding hatch extending across the vehicle body forward of the tailgate for selectively closing the forward portion of the cargo opening, a rearward edge of the hatch mating against an upper edge of the tailgate when the tailgate and hatch are in respective closed positions, the sliding hatch slidable to a slide open position for opening the forward portion of the cargo opening; and
   a roof panel disposed forward of the sliding hatch, the roof panel movable to a raised position and the sliding hatch movable to a position below the roof panel when the sliding hatch is moved toward the slide open position.

2. The coupe-type vehicle of claim 1 wherein the sliding hatch includes a pivotable closure for selectively closing a hatch opening defined by the sliding hatch, the pivotable closure movable to a pivot open position for opening the hatch opening.

3. The coupe-type vehicle of claim 1 wherein the tailgate is a drop-down tailgate.

4. The coupe-type vehicle of claim 3 wherein the tailgate forms a load-carrying platform when in the open position that extends from the upper edge of the tailgate to a lower edge of the tailgate pivotally connected to the vehicle body.

5. The coupe-type vehicle of claim 1 wherein the roof panel is a rigid panel.

6. The coupe-type vehicle of claim 1 wherein the raised position includes a first raised sub-position for allowing sliding movement of the sliding hatch between the slide open position and the closed position and a second raised sub-position for harboring the sliding hatch in the slide open position, the first raised sub-position elevated higher than the second raised sub-position.

7. The coupe-type vehicle of claim 1 wherein the sliding hatch includes a window providing rearward viewing for the vehicle body.

8. The coupe-type vehicle of claim 1 wherein the vehicle body includes rear quarter panels defining the rear portion of the vehicle body and defining lateral sides of the rearward portion of the cargo opening at the rear of the vehicle.

9. The coupe-type vehicle of claim 8 wherein rear quarter panels each include a C-pillar and an angularly oriented roof rail extending from the rear portion of the vehicle body to the upper end of the C-pillar, the roof rails of the rear quarter panels defining lateral sides of the forward portion of the cargo opening.

10. A vehicle having a rear cargo opening, comprising:
    laterally spaced apart rear quarter panels having side portions and rear corner portions, the side portions including roof support members respectively extending forwardly and upwardly from the rear corner portions;
    a rear portion of a cargo opening defined between rear corner portions of the rear quarter panels below lower ends of the roof support members;

a forward portion of the cargo opening defined between the roof support members above the rear corner portions;

a windowless tailgate selectively closing the rear portion of the cargo opening;

a sliding hatch member selectively closing the forward portion of the cargo opening, the sliding hatch member angularly disposed along the roof support members when in a closed position, the sliding hatch including a transparent window and arranged such that the transparent window provides primary rearward viewing for the vehicle; and a roof panel assembly disposed forward of the sliding hatch, the roof panel movable between a closed position and a raised position wherein the sliding hatch is slidably received under the roof panel.

11. The vehicle of claim 10 wherein the roof panel assembly is a dual-panel assembly including a forward panel and a rearward panel, adjacent edges of the panels hingedly connected together.

12. The vehicle of claim 10 wherein the sliding hatch includes a frame and a hatch closure pivotally mounted to the frame, the hatch closure openable to provide access through the forward portion while the sliding hatch is in a slide closed position.

13. The vehicle of claim 10 wherein the tailgate is a swing-down tailgate pivotally mounted to the rear quarter panels adjacent a lower edge of the tailgate.

14. The vehicle of claim 10 wherein an upper edge of the tailgate seals against a lower edge of the sliding hatch when the tailgate and the sliding hatch are in respective closed positions.

15. A hatchback vehicle, comprising:
a drop-down tailgate;
a panoramic roof assembly having a plurality of positions including a closed position and a raised position; and
a dual-action rear hatch having a sliding mode wherein the hatch is movable from a closed position to a slide forward position wherein the rear hatch is received under the roof assembly when in the raised position, and having a flip-open mode wherein the rear hatch is flipped-open while in a slide closed position, wherein the roof assembly includes a forward panel and a rearward panel hingedly connected to the forward panel, the forward and rearward panels together aerodynamically accommodating the hatch when in the slide forward position to direct airflow over the hatch.

16. The hatchback vehicle of claim 15 wherein the plurality of positions further includes a second, slightly lower raised position.

17. The couple-type vehicle of claim 1 wherein the roof panel is movable to at least two positions, including the raised position for accommodating the sliding hatch and a closed position, and wherein the raised position includes a first raised sub-position for allowing sliding movement of the sliding hatch between the slide open position and the closed position and a second raised sub-position for harboring the sliding hatch in the slide open position, the first raised sub-position elevated higher than the second raised sub-position.

18. The coupe-type vehicle of claim 1 wherein the roof panel is movable to at least three positions, including the raised position for accommodating the sliding hatch, a closed position and a tilt position.

19. The hatchback vehicle of claim 15 wherein the plurality of positions further includes a tilt open position.

\* \* \* \* \*